US012407788B2

(12) United States Patent
Pipher (10) Patent No.: US 12,407,788 B2
(45) Date of Patent: Sep. 2, 2025

(54) VIDEO GAME ENGINE ASSISTED VIRTUAL STUDIO PRODUCTION PROCESS

(71) Applicant: Tim Pipher, Burbank, CA (US)

(72) Inventor: Tim Pipher, Burbank, CA (US)

( * ) Notice: Subject to any disclaimer, the term of this patent is extended or adjusted under 35 U.S.C. 154(b) by 194 days.

(21) Appl. No.: 17/961,300

(22) Filed: Oct. 6, 2022

(65) Prior Publication Data

US 2023/0077552 A1  Mar. 16, 2023

Related U.S. Application Data

(63) Continuation-in-part of application No. 17/453,098, filed on Nov. 1, 2021, now abandoned, which is a continuation of application No. 16/155,373, filed on Oct. 9, 2018, now Pat. No. 11,165,972.

(60) Provisional application No. 62/569,844, filed on Oct. 9, 2017.

(51) Int. Cl.
*H04N 5/272* (2006.01)
*G06T 19/00* (2011.01)
*G11B 27/02* (2006.01)
*H04N 5/222* (2006.01)
*H04N 5/262* (2006.01)
*H04N 21/218* (2011.01)
*H04N 21/2187* (2011.01)
*H04N 23/90* (2023.01)

(52) U.S. Cl.
CPC .......... *H04N 5/272* (2013.01); *G06T 19/006* (2013.01); *G11B 27/02* (2013.01); *H04N 5/2224* (2013.01); *H04N 5/2628* (2013.01); *H04N 21/2187* (2013.01); *H04N 23/90* (2023.01); *H04N 21/21805* (2013.01)

(58) Field of Classification Search
CPC ...... H04N 5/272; H04N 5/2224; H04N 5/247; H04N 5/2628; H04N 21/2187; G11B 27/02; G06T 19/006
See application file for complete search history.

(56) References Cited

U.S. PATENT DOCUMENTS

| 6,476,874 | B1 | 11/2002 | Ito | |
| 6,522,787 | B1 | 2/2003 | Kumar | |
| 2012/0002061 | A1 | 1/2012 | Gay | |
| 2019/0358547 | A1* | 11/2019 | Mack | H04N 21/2187 |
| 2024/0013492 | A1* | 1/2024 | Tahara | G06T 7/73 |

OTHER PUBLICATIONS

Publication of KR101373631 B1, Mar. 12, 2014 (Year: 2014).
Translation of Publication of KR101373631 B1, Mar. 12, 2014 (Year: 2014).

* cited by examiner

*Primary Examiner* — Nicholas G Giles
(74) *Attorney, Agent, or Firm* — Gary L. Eastman, Esq.; Eastman IP (57) ABSTRACT

A production process involves predetermined number of cameras simultaneously filming a background at predetermined angles, and filming actors in a studio with the same number of cameras and the same angles, used in conjunction with a virtual studio system. In studio, the actors perform before a green screen and the virtual studio system composites the actors onto the background in real-time. Camera tracking allows the in-studio cameras to pan, tilt, focus, zoom, and make limited other movements as the virtual studio system adjusts display of the background in a corresponding manner, resulting in a realistic scene without transporting actors and crew to the background location.

15 Claims, 8 Drawing Sheets

VIDEO GAME ENGINE ASSISTED VIRTUAL STUDIO PRODUCTION PROCESS

RELATED APPLICATIONS

This application is a continuation-in-part of U.S. Utility patent application Ser. No. 17/453,098 entitled "Multi-Camera Virtual Studio Production Process," filed Nov. 1, 2021, and currently co-pending, which is a continuation of U.S. Utility patent application Ser. No. 16/155,373 entitled "Multi-Camera Virtual Studio Production Process," filed Oct. 9, 2018, and issued as U.S. Pat. No. 11,165,972 on Nov. 2, 2021, and which claims priority to U.S. Provisional Patent Application Ser. No. 62/569,844 entitled "Multi-Camera Virtual Studio Production Process," filed Oct. 9, 2017. Each of the aforementioned applications is fully incorporated herein by reference.

FIELD OF THE INVENTION

The present invention pertains generally to a process for filming and video production with multi-camera virtual studio systems. More specifically, the present invention pertains to a compositing process where in-studio actors are filmed with a green screen and combining the in-studio foreground with background plates, scene elements generated by a video game engine, or both. The present invention is particularly, but not exclusively, useful as a method for producing realistic scenes without transporting actors and crew to locations outside of the studio.

BACKGROUND OF THE INVENTION

Chroma keying is a common technique in filming which allows actors and objects to be placed against a separately prepared background. The process involves filming the actors and objects in front of a specific color, and, in post-production, replacing the color with the desired background. The process is popularly known as "green screen" due to the frequent use of green as the chroma key color, although blue is also commonly used.

Problems with background consistency occasionally arise when using traditional chroma keying techniques, especially when a scene is filmed at multiple angles. One common issue is that a person or object in the background might disappear or be in an unexpected place when the camera angle is switched.

Background consistency problems can be partially avoided by filming actors on location rather than using chroma keying to change the background. One disadvantage of filming actors on location is the expense, time, and logistical considerations involved in transporting actors and crew to the actual locations of the film's setting. Moreover, background inconsistencies arise even in on-site filming if multiple shots, taken at different times or on different days, are tied together in a single scene.

As an alternative to green screen filming, some modern studios are filming against a background displayed on a large light-emitting-diode (LED) video screen. This technique is often used with software that dynamically generates scenery, such as a video game engine. Nonetheless, this technique presents a number of drawbacks to which a satisfactory solution is not yet known in the art, despite attempts to minimize them.

One drawback with filming against an LED video screen is that the talent is not in the set, they are only in front of it. Accordingly, a real set needs to be built in front of the LED screen, including some combination of floors, walls, ceilings, trees, a sky, buildings, and other elements depending on the intended setting.

Filming against an LED screen is also limited to a single camera, and quick camera moves cannot be made because the tracking delay inherent to using an LED screen causes the picture to jump at the start of the camera move.

With an LED screen background, the camera cannot focus or zoom into virtual objects that may be an important part of the scene because the pixels become visible. This is a result of shooting video of a video. Likewise, there is no depth-of-field effect; the blur is set and it does not change.

Another drawback of filming against an LED screen is that the appearance of the resulting video is strange around actors' and actresses' shoulders due to pixelization.

Moreover, filming against an LED screen complicates are makes impossible certain work in postproduction. Since the background and foreground are filmed together, changes like color correction or adjustments to ambient lighting, fog, or other adjustments and fixes apply to the entire scene, causing problems if a change or fix needs to be made to the background only, or only to the foreground.

LED screens also tend to be noisy, resulting in the need for automated dialog replacement (ADR) in postproduction, which results in a significant amount of extra work as audio is re-recorded in a quieter environment.

In light of the above, it would be advantageous to provide a method of providing a consistent background in filmed scenes.

It would be further advantageous to provide a method of filming actors in a studio separate from a scene's background, while providing consistency in the scene's background.

It would be further advantageous to provide a method of filming that allows for combination of camera-filmed actors and game engine scenery that avoids the limitations and drawbacks of filming against an LED video screen.

SUMMARY OF THE INVENTION

The present invention provides a process for use in conjunction with multi-camera virtual studio systems, which greatly enhances the realism of film, video, and TV productions shot on green screen stages. As used herein, "green screen" is contemplated to include, in addition to green backgrounds, blue backgrounds or backgrounds of any other color desirable under the circumstances, for use with chroma keying techniques.

Actors can be filmed from the comfort of the green screen stage, but appear, with tremendous realism, to be performing in any location the producer wishes, including locations that normally would be expensive or difficult to film in. As a non-limiting example, the actors may appear to be performing in retail stores, offices, golf courses, restaurants, mansions, on the beach, or in any other location. The result includes significantly lowered expenses since actors and crew do not need to be transported to actual locations.

The process comprises filming, simultaneously with multiple cameras, backgrounds in actual locations that the producer would like re-created in the studio. These shots are called "background plates" or simply "plates." These plates are shot with multiple cameras, all recording at once, at multiple angles. Importantly, the angles are the same angles that the cameras will be at in studio. The quantity of cameras recording the plates is the same quantity as the cameras that will be filming in the studio. For example, if the producer will be filming with a three-camera set-up in the studio, the background plates should be shot using three cameras recording simultaneously in the field, in the same configuration, including the same angles as the studio cameras will be filming in-studio. If the producer will be filming with four cameras in-studio, there should be four cameras filming the background plates. If two cameras will be filming in the studio, there should be two background plate cameras. In general, if any other number of cameras will be filming in the studio, there should be that same number of cameras filming the background plates.

By filming with this process, if a person in the background plate—effectively an "extra"—is walking across the background, and during the studio production a camera is switched to pick up a different angle, that background person will be picked up by the switched-to camera in the correct place and at the correct angle as he would be if he were actually in the studio with the foreground actors on stage. Without this technique, using traditional green screen methods, when the camera switches, that background actor would either disappear, or there would be somebody or something else in the spot he should be, which would ruin the realism. The same is true of cars, birds, bicycles, and everything else that would or could be making its way across the background as cameras switch.

An embodiment uses a video game engine such as the Unreal Engine, to provide the environment onto which the images of the actors filmed in front of a green screen are composited. A scene is generated with the video game engine, and the background is generated in real time by adjusting the virtual camera position, angle, and zoom to correspond to those of the foreground camera from which foreground scenery is being used. In an embodiment a single virtual camera is used, and the camera effectively jumps locations when switching between foreground cameras; this is possible because the video game engine allows for virtually instantaneous alteration to the position, angle, zoom, and other attributes of the virtual camera. In another embodiment, multiple virtual cameras matching the foreground cameras in location, angle, and zoom are used. In both embodiments, each virtual camera follows the pan, tilt, and zoom performed by the foreground camera associated with it at any given moment. Moreover, with the use of a virtual 3D environment, the in-studio cameras are not limited to panning, tilting, and zooming: The in-studio cameras can pan, tilt, zoom, and focus, as with embodiments using background plates, but can also jib and move in any other way the producer desires.

The use of a green screen solves the problems generated by the use of an LED display to provide engine-generated backgrounds and results from a recognition of the previously unknown source of the problem of a lack of realism when LED displays are used: The LED displays cause pixelization and generate noise, all of which results in additional work in post-production, but in addition, real shadows from the foreground actors and objects are not properly cast into the scene generated by a video game engine. The use of a green screen allows the actual shadows captured by the foreground cameras to be composited into the virtual scene, greatly enhancing realism.

In another embodiment, background plates are shot as described previously, and a video game engine is used for generating additional scene elements, with virtual cameras as described above. Thus, each background plate and virtual camera is synchronized with its corresponding foreground camera. The benefits with respect to shadows and the generated scene elements are retained in this embodiment also.

BRIEF DESCRIPTION OF THE DRAWINGS

The nature, objects, and advantages of the present invention will become more apparent to those skilled in the art after considering the following detailed description in connection with the accompanying drawings, in which like reference numerals designate like parts throughout, and wherein.

DETAILED DESCRIPTION

Figure 1:
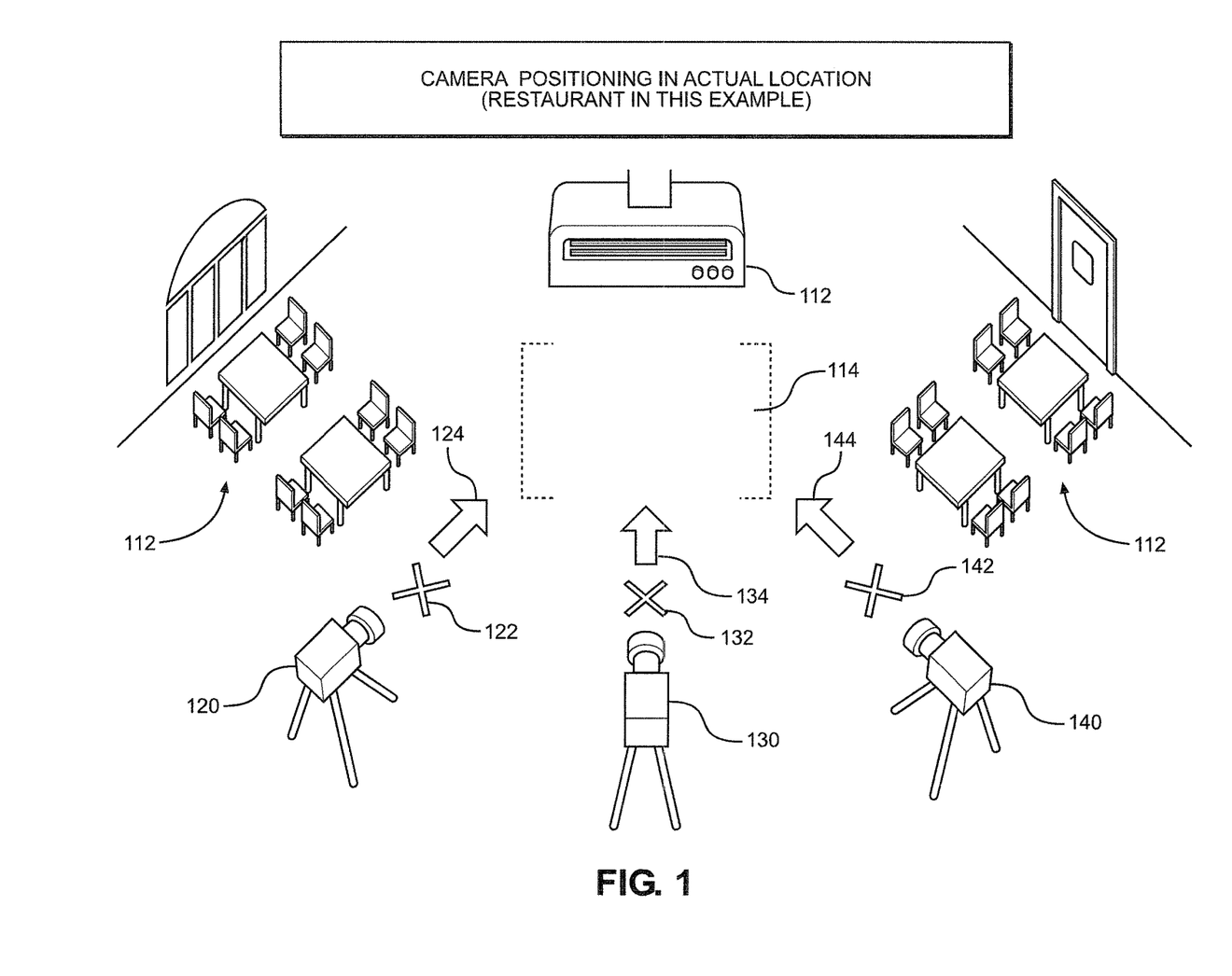
FIG. 1 is a diagram of camera positioning for filming a background in an actual location.

Referring initially to FIG. 1, the positioning of cameras at a background location is shown. The background location may be at any desired location, but is shown here as a background for a scene that takes place in a restaurant. As shown in FIG. 1, background elements 112 are present in the forms in which they appear in the location, including windows, tables, and a pizza oven in the present example. An empty space 114 may be prepared in some circumstances where the principal part of the foreground action will take place. For example, in a restaurant, an empty space may be created by moving away tables and chairs.

Three cameras are depicted in FIG. 1, although any number of cameras may be used, depending on the particular needs of the scene. More particularly, setups with two to four cameras are most common for TV productions, and the present invention works particularly well with such setups. Nonetheless, some films have used several dozen cameras for special purposes or effects, such as "bullet time." The present invention also works well with setups involving large numbers of cameras, and can avoid the labor, cost, and other drawbacks involved in using computer-generated backgrounds.

As seen in FIG. 1, a left camera 120 is placed at a left camera position 122 and a left camera angle 124, while a middle camera 130 is placed at a middle camera position 132 and a middle camera angle 134, and a right camera 140 is placed at a right camera position 142 and a right camera angle 144. The left camera 120, middle camera 130, and right camera 140 all film at the same time, for at least the duration of time the corresponding scene is expected to last.

Figure 2:
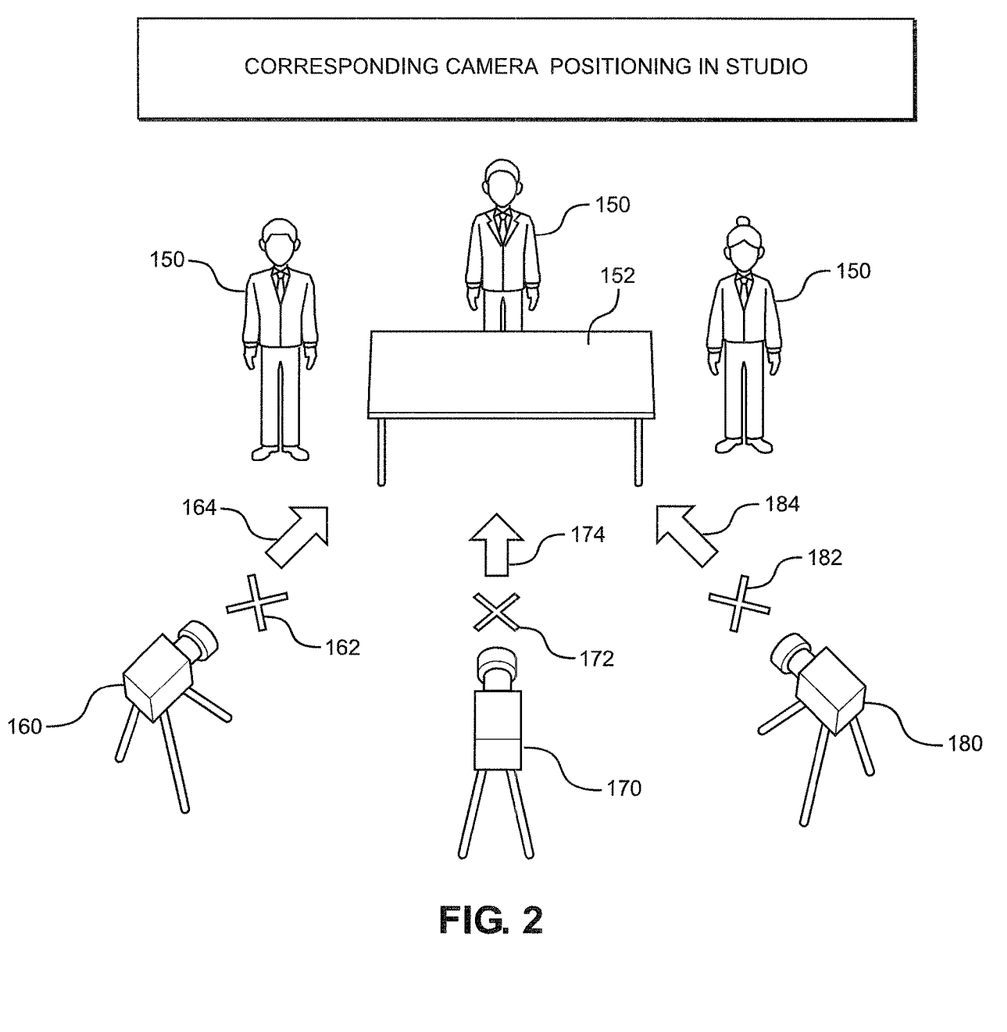
FIG. 2 is a diagram of camera positioning for filming actors and foreground objects in studio.

Referring now to FIG. 2, in the studio actors 150 and props 152 are located in front of a green screen (not depicted). A left camera 160 is located at a left camera position 162 and a left camera angle 164, while a middle camera 170 is located at a middle camera position 172 and a middle camera angle 174, and a right camera 180 is located at a right camera position 182 and a right camera angle 184. The relative positions of left, middle, and right camera positions 162, 172, and 182 in the studio are the same as the relative positions of left, middle, and right camera positions 122, 132, and 142 on location. The angles 164, 174, and 184, are the same, relative to each other, as the angles 124, 134, and 144. In this way, foreground elements from a studio camera at a particular point in time can be placed against the background from a background location camera of the corresponding position, angle, and time, resulting in temporal and spatial consistency in the scene.

Filming takes place onstage in conjunction with a virtual studio system, such as those sold in conjunction with the marks Zero Density, BRAINSTORM, or VIZRT, with camera tracking. Camera tracking is a system through which data flows from the cameras to the virtual studio system in such a way that the virtual background will automatically move around to correspond with in-studio camera movement. The studio cameras are free to pan, tilt, zoom, focus, and make a certain amount of other movement. These in-studio camera movements don't need to match movement in the on-location plates. In fact, the on-location filming is conducted with "locked down" non-moving cameras. This gives the filmmaker the freedom to make the camera moves that the story requires in-studio, allowing for artistic freedom and further enhancing the impression of reality.

Figure 3:
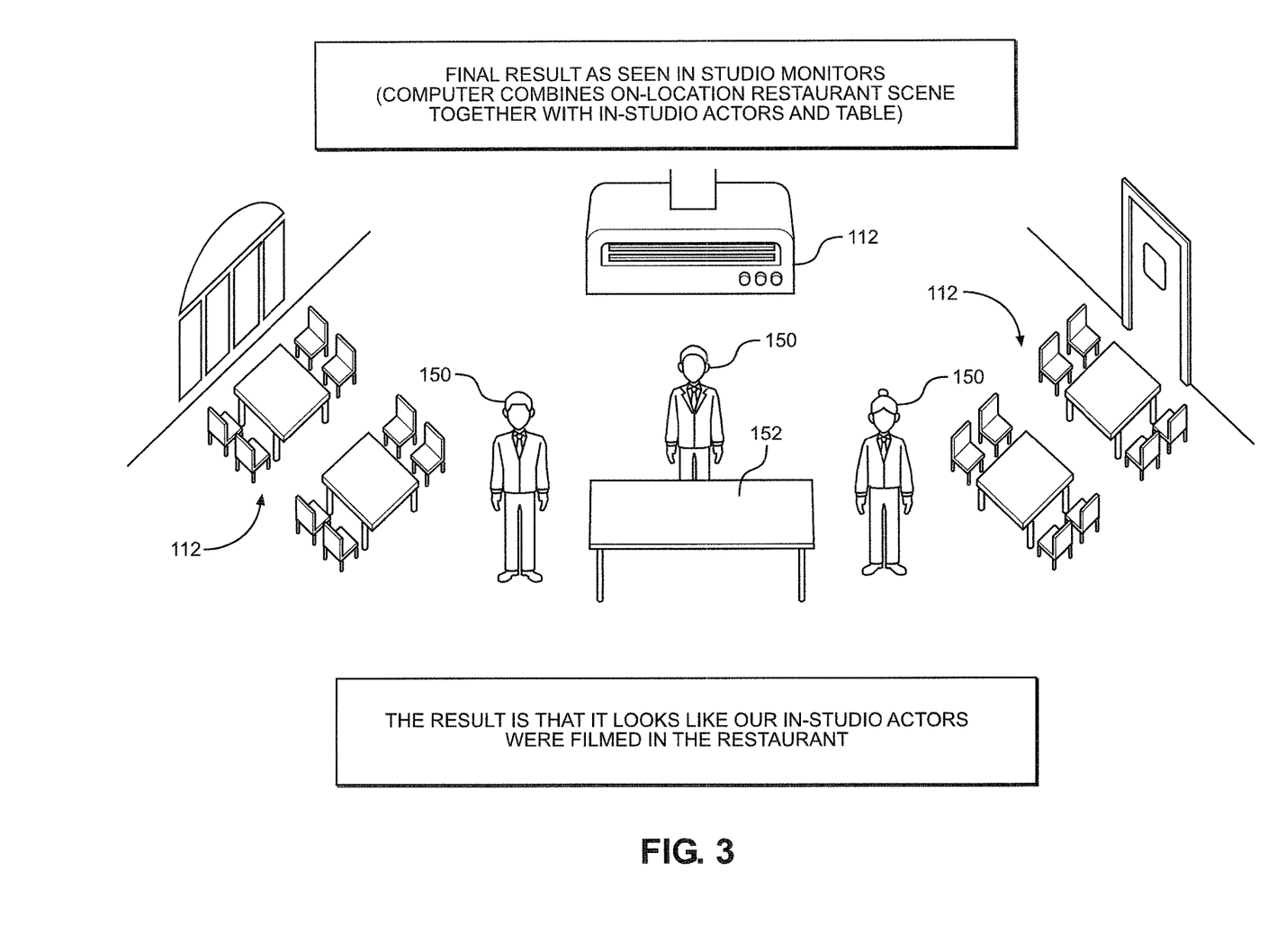
FIG. 3 is a diagram the combination of the background and foreground as each would appear to be positioned when seen in studio monitors.

Referring now to FIG. 3, the result of the process is depicted. The actors 150 and props 152 appear to be acting in the location filmed by the background cameras. As the view is switched between camera angles, background elements, including transitory elements such as people or animals, appear consistently in the expected places, resulting in a realistic, "three-dimensional" depiction of the scene. This result may be seen in real-time on studio monitors and recorded as the actors are performing. By depicting and recording it in real-time, a director can determine immediately if the scene is satisfactory, or a "live" TV show can be broadcast. The on-location plates (the background) and in-studio live action (the foreground) are composited, or combined, live, saving the expense of post-production compositing and allowing for in-studio camera movement.

More generally, the result may be prepared by a computer and depicted in real-time on studio monitors as the actors are performing, or it may be prepared in post-processing, or both. By depicting it in real-time, a director can determine immediately if the scene is satisfactory, or a "live" TV show can be broadcast. Performing or re-performing the combination during post-processing allows film editors to fine tune the effect and add or adjust any element as desired. If the foreground and background are combined in post-production, the order of filming isn't limited to doing the background first. The background and foreground elements could be filmed in any order, although one advantage of filming the background first is the ability to preview the resultant combination in real-time in the studio.

Thus, in a preferred embodiment, tracking data is used for real-time compositing, and in an alternative embodiment, tracking data is stored for compositing the in-studio actors with the backgrounds later, during post production. In some embodiments, the background and foreground are composited live on studio monitors, and the tracking data is stored and the final combination of the foreground with the background plates is performed later, during post production. In situations in which computational power may be limited, this allows the use of a more efficient compositing algorithm in real-time on the studio monitors and a higher quality compositing algorithm, or even manual intervention in the compositing process, at a later time.

Figure 4:
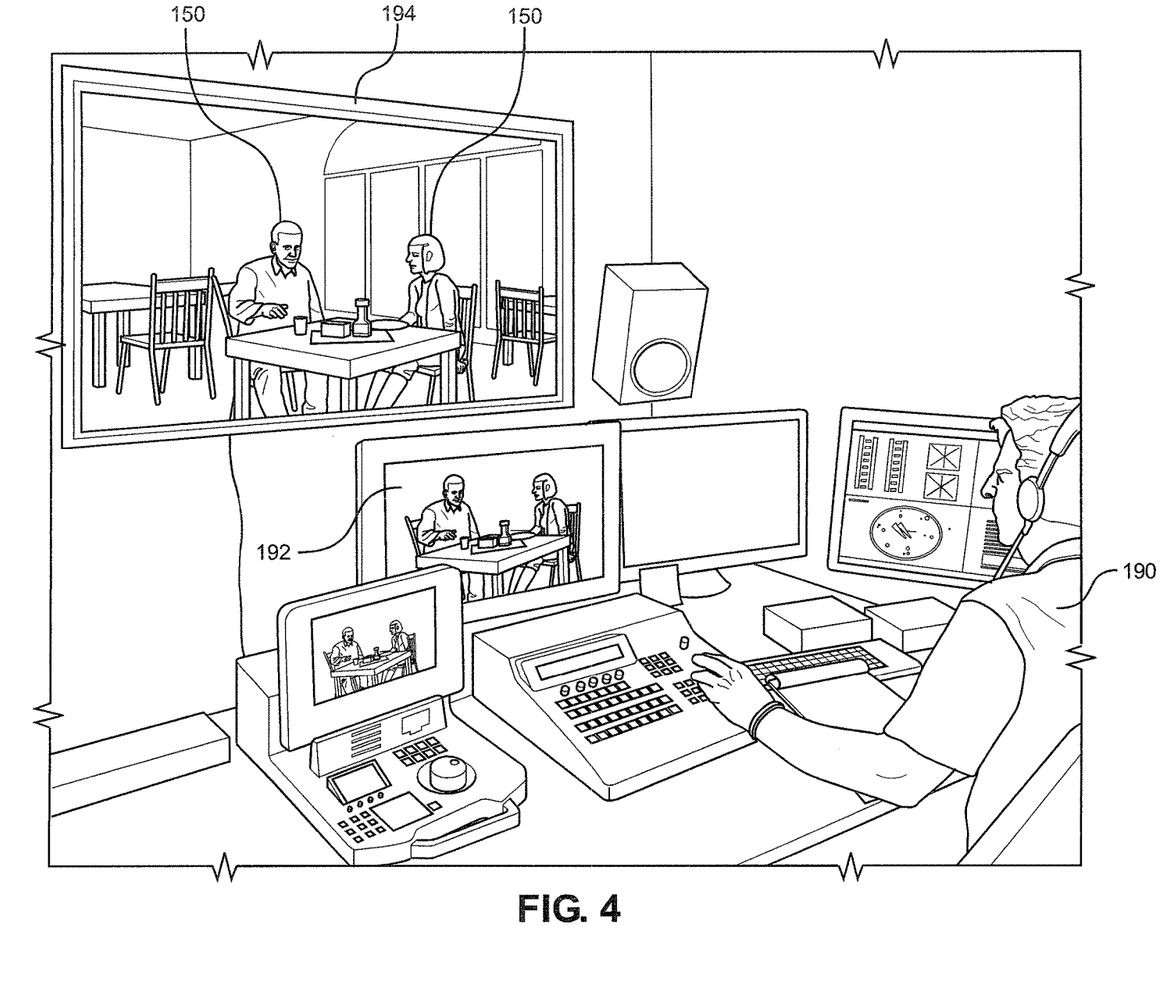
FIG. 4 is a depiction of the foreground of a scene displayed on the console of a studio technician while the foreground is composited on the background in real-time on a studio monitor.

Referring now to FIG. 4, a production control room is shown, in which a technician 190, such as a technical director, is shown at a workstation. The technician 190 sees the foreground, with the actors 150 and props 152 against the green screen background on a workstation monitor 192. Another studio monitor 194 displays, at the same time, the scene including the foreground composited onto the virtual background. Before in-studio filming, each of the in-studio cameras is associated with a background plate in the virtual studio system. Then, during filming, the virtual studio system composites the foreground captured by each in-studio camera onto the corresponding virtual background, using camera tracking to adjust the virtual background in correlation with the panning, tilting, zooming, focusing, and movement of the in-studio cameras.

Figure 5:
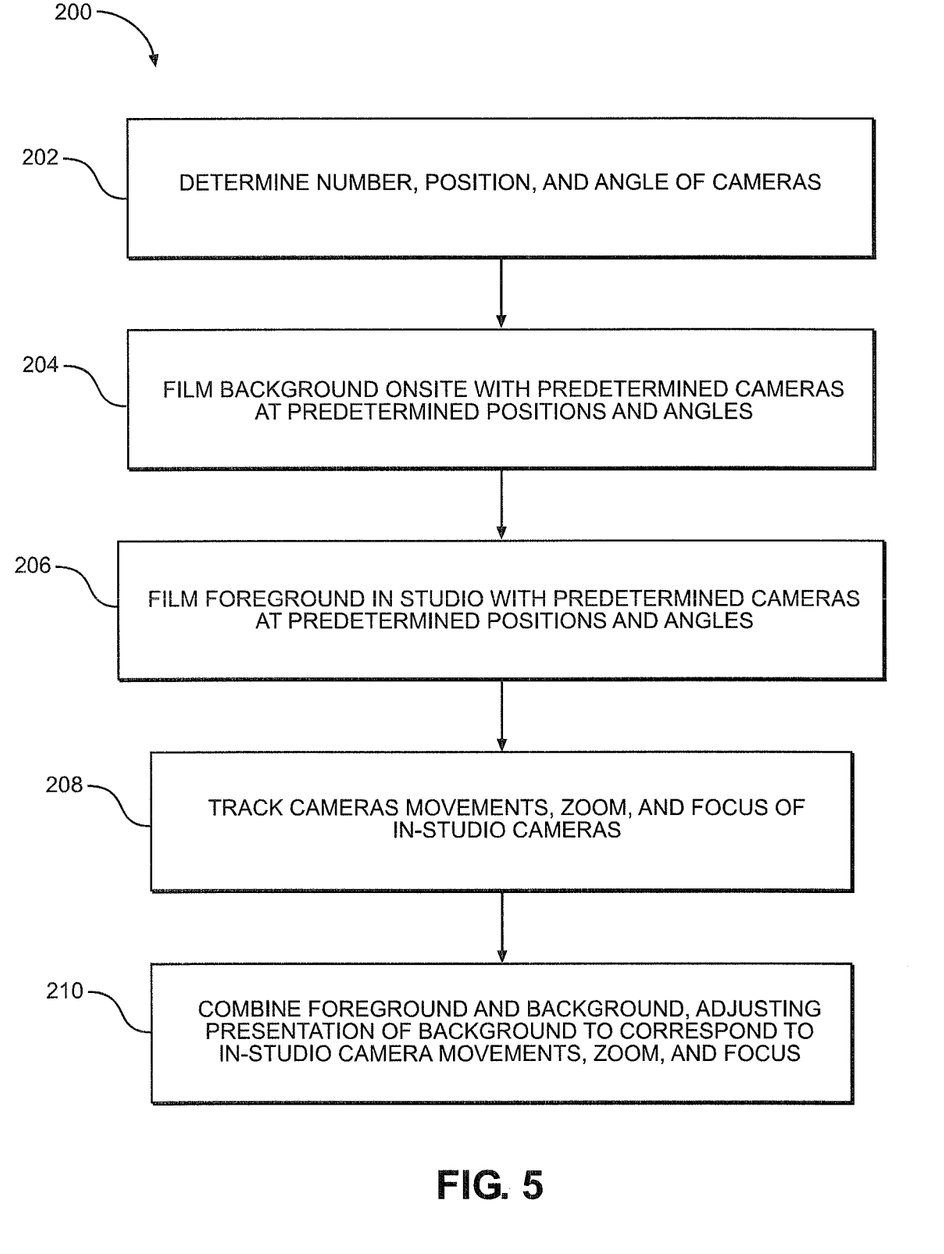
FIG. 5 is a diagram of the basic steps involved in the method of the present invention.

Referring now to FIG. 5, an outline of the primary steps in the process of the present invention is diagrammed and generally designated 200. A first step 202 involves providing a predetermined number of cameras, as well as a predetermined position and angle for each camera. A second step 204 involves filming the background on location with the predetermined number of cameras at the predetermined positions and angles. A third step 206 involves filming the foreground in the studio and in front of a green screen. The third step 206 also uses the same predetermined number of cameras at the same predetermined positions and angles. During in-studio filming, a fourth step 208 comprises camera tracking, also known as match moving. In this step, in-studio camera movements, including zooming, panning, tilting, and focus, are provided to the virtual studio system. A fifth step 210, which, as discussed above, may occur simultaneously with the third step 206 and the fourth step 208 using computer technology, involves compositing, or placing the foreground elements on the background plates. The in-studio camera movement data provided by the fourth step 208 allows the virtual studio system to adjust the display of the background—e.g., making it bigger, panning to a different part of the background image, etc.—in order to make the in-studio camera movement appear to affect both foreground and background elements. This compositing, including camera tracking and corresponding background adjustments, can be performed in real-time and appear on in-studio monitors during filming and, if desired, even be broadcast live.

Figure 6:
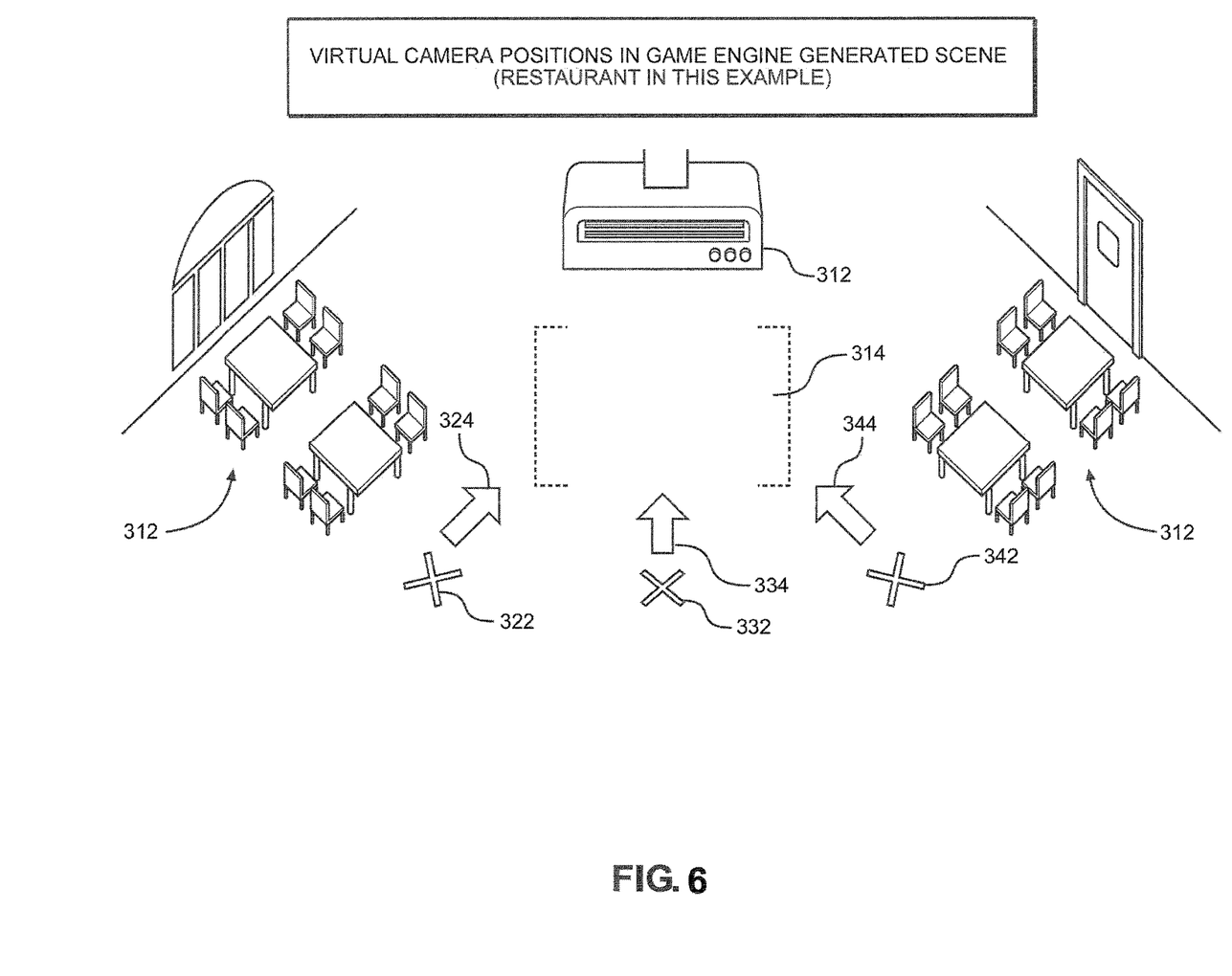
FIG. 6 is a diagram of virtual camera positioning in a scene generated with a video game engine.

Referring now to FIG. 6, the positioning of virtual cameras in a scene generated with a video game engine is illustrated. Scene elements 312 are placed throughout the virtual space by modelers, with an optional space 314 designated for foreground action. However, by using a video game engine to render the scene, objects can be rendered much closer to the actors without the need to be physically present in the studio.

Since the scene is computer generated, there are no physical cameras, but the scene is rendered by the video game engine as if a camera were at a location and angle that corresponds to a foreground camera's location and angle, such as locations 162, 172, and 182 and angles 167, 174, and 184 of cameras 160, 170, and 180 (shown in FIG. 2). For example, location 322 with angle 324, location 332 with angle 334, and location 340 with angle 342 correspond to an exemplary three-camera layout. The virtual camera pans, tilts, and zooms, jibs, or otherwise moves to match the corresponding panning, tilting, zooming, and other movements of its corresponding foreground camera, thus displaying the scenery correctly around the foreground actors and elements. This can be performed with a single virtual camera that is relocated whenever the foreground view is switched between foreground cameras, or by multiple virtual cameras with each virtual camera corresponding to a foreground camera. Accordingly, the in-studio cameras can pan, tilt, zoom, focus, jib, and move in any other way the producer desires.

In some embodiments, only some specific scene elements 312 are generated by the video game engine on a transparent background, the elements 312 are then composited onto background plates generated by background cameras such as background cameras 120, 130 and 140 (shown in FIG. 1). The result is three distinct layers being composited for the film or broadcast: The foreground filmed in studio, the additional scene elements generated by the video game engine, and the background filmed on location. This allows for great flexibility in generating otherwise difficult scene elements and special effects, and even allows for such effects to be generated and composited during a live broadcast.

Figure 7:
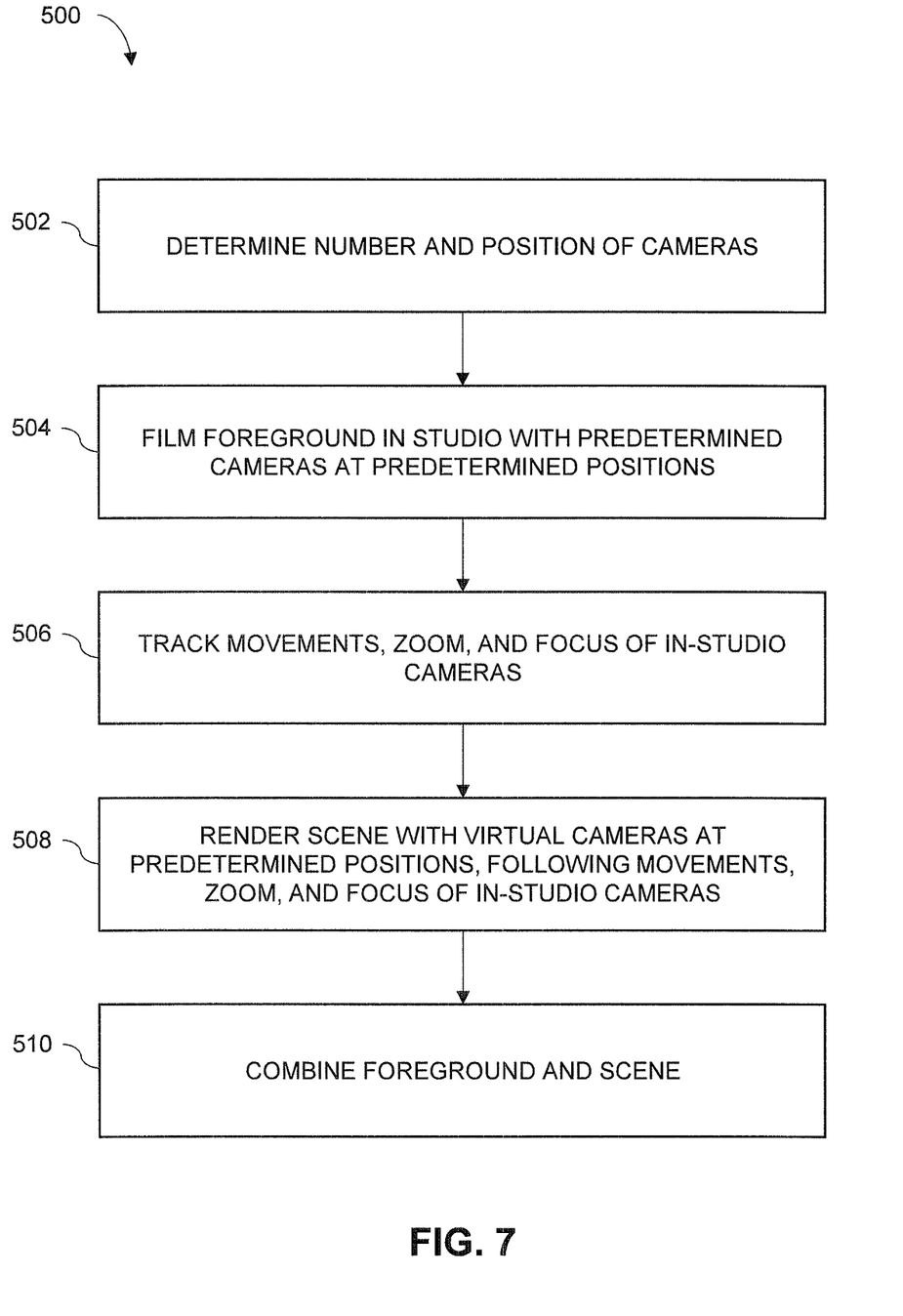
FIG. 7 is a diagram of the basic steps involved in an alternate preferred embodiment of the present invention using a video game engine to generate the background and scenery.

Referring now to FIG. 7, an outline of the primary steps in the process of a preferred embodiment of the present invention is diagrammed and generally designated 500. A first step 502 involves providing a predetermined number of cameras, as well as a predetermined position for each camera. Since the background will be generated by a video game engine, the virtual cameras can move in any and all directions—the movement is not limited as with 2D background plates—so the angles and movement of the in-studio cameras do not need to be pre-determined at all. A second step 504 involves filming the foreground in the studio and in front of a green screen using the predetermined number of cameras at the predetermined positions and angles. During filming in step 504, step 506 is also performed, in which the movements, zoom, and focus of the in-studio cameras is tracked. The tracking in step 506 is performed by a virtual studio system in some embodiments, and by similar routines added to the video game engine in some other embodiments. Accordingly, the in-studio cameras can pan, tilt, zoom, focus, jib, and move in any other way the producer desires.

In step 508, the scene is rendered by the video game engine using virtual cameras that track the positions, angles, movements, zoom, and focus of the in-studio cameras. Prior to this step, the scene is modeled in the same way as video game environments; this can be done by studio artists, or a pre-created scene, such as one purchased from a video game environment marketplace, can be used. The foreground is composited onto the resulting scene in step 510. In some embodiments, steps 508 and 510 are performed in real-time, that is, at the same time steps 504 and 506 are performed, in order to allow for a live broadcast.

By adjusting the lighting and camera settings prior to filming in step 504, beautiful real shadows emerge on the studio floor and are captured by the camera; these shadows in turn integrate seamlessly with the virtual floors generated in step 508, which adds significantly to the realistic nature of the result: The virtual scene looks more real by virtue of the real shadows.

In some embodiments, the video game engine used to render the scene in step 508 also performs the compositing in step 510. This is made possible by the customizability of some popular video game engines, such as the Unreal Engine—which is generally provided with source code allowing even for source-level modification—that allows for the addition of routines for chroma keying that would be needed or useful in adding video from the foreground cameras to the rendered scenes.

In some preferred embodiments, however, compositing is performed by the virtual studio system, such as VizRT, Brainstorm, or another virtual studio system, which in turn accesses the video game engine (e.g., through the virtual studio's plugin system) to generate the background frames onto which the foreground is composited.

Figure 8:
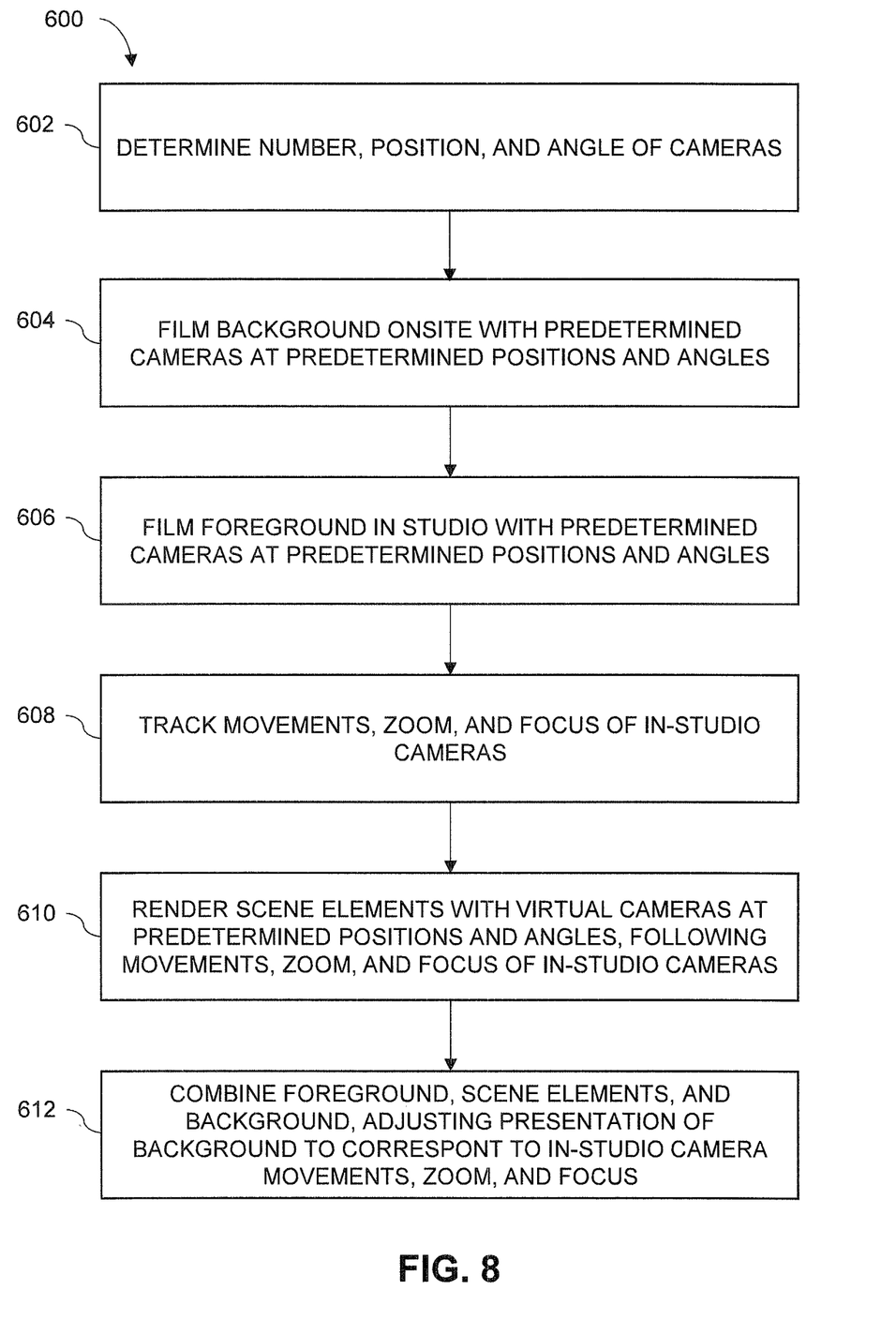
FIG. 8 is a diagram of the basic steps involved in another alternate preferred embodiment of the present invention using a video game engine to generate some scene elements in conjunction with filming a background on location.

Referring now to FIG. 8, an outline of the primary steps in the process of a preferred embodiment of the present invention is diagrammed and generally designated 600. Process 600 combines steps from process 200 (shown in FIG. 5) and process 500 (shown in FIG. 7) in order to provide features from both processes.

A first step 602 involves providing a predetermined number of cameras, as well as a predetermined position and angle for each camera. A second step 604 involves filming the background on location with the predetermined number of cameras at the predetermined positions and angles. A third step 606 involves filming the foreground in the studio and in front of a green screen. The third step 606 also uses the same predetermined number of cameras at the same predetermined positions and angles. During in-studio filming, a fourth step 608 comprises camera tracking, also known as match moving. In this step, in-studio camera movements, including zooming, panning, tilting, and focus, are provided to the virtual studio system. The tracking in step 608 is performed by a virtual studio system in preferred embodiments, and by similar routines added to the video game engine in some other embodiments.

In step 610, the scene is rendered by the video game engine using virtual cameras that track the positions, angles, movements, zoom, and focus of the in-studio cameras.

Step 612, which, as discussed above, may occur simultaneously with the third step 606 and the fourth step 608 using computer technology, involves compositing, or placing the foreground elements on the background plates. The in-studio camera movement data provided by the fourth step 608 allows the virtual studio system to adjust the display of the background—e.g., making it bigger, panning to a different part of the background image, etc.—in order to make the in-studio camera movement appear to affect both foreground and background elements. This compositing, including camera tracking and corresponding background adjustments, can be performed in real-time and appear on in-studio monitors during filming and, if desired, even be broadcast live.

The compositing step in 612 differs from step 210 (see FIG. 5) of process 200 in that scene elements rendered in step 610 are also added to the final product during compositing. In some embodiments, this step is performed by the same compositing software used to combine the foreground and background elements, such as the video game engine as described above in connection with step 510 of FIG. 5, while in other embodiments a separate software system is used.

While there have been shown what are presently considered to be preferred embodiments of the present invention, it will be apparent to those skilled in the art that various changes and modifications can be made herein without departing from the scope and spirit of the invention.

What is claimed is:

1. A method for realistic offsite filming, comprising the steps of:
preparing a scene comprising a virtual space;
placing scene elements in the virtual space;
designating a space in the virtual space for foreground action;

determining a number of cameras with corresponding positions and angles;

filming a foreground with the determined number of studio cameras at the determined positions and angles;

tracking camera movements, zoom, and focus of each of the studio cameras during the step of filming a foreground;

rendering a background using the scene with virtual cameras following the movements, zoom, and focus of the studio cameras; and combining the foreground and background.

2. The method for realistic filming as recited in claim 1, wherein the steps of rendering a background and combining the foreground and background are performed at the same time as the step of filming a foreground.

3. The method for realistic filming as recited in claim 2, further comprising the step of displaying the combined foreground and background in real-time on studio monitors during the step of filming the foreground.

4. The method for realistic filming as recited in claim 3, further comprising the step of broadcasting the combined foreground and background live during the step of filming the foreground.

5. The method for realistic filming as recited in claim 1, wherein the step of rendering a background is performed by a video game engine.

6. The method for realistic filming as recited in claim 1, wherein the steps of rendering a background and combining the foreground and background are performed by a video game engine.

7. The method for realistic filming as recited in claim 1, wherein the step of rendering a background is performed by a video game engine, and wherein the step of combining the foreground and background is performed by a virtual studio system.

8. A method for realistic offsite filming, comprising the steps of:

providing a studio having a green screen;

determining a number of cameras with corresponding positions and angles;

filming a background on location with the determined number of cameras at the determined positions and angles;

filming a foreground in the studio against the green screen with the determined number of cameras at the determined positions and angles;

tracking camera movements, zoom, and focus of each of the cameras during the step of filming a foreground;

rendering additional scene elements with virtual cameras following the movements, zoom, and focus of the studio cameras; and combining the foreground, background, and additional scene elements, adjusting the presentation of the background to correspond to the tracked movements, zoom, and focus.

9. The method for realistic filming as recited in claim 8, wherein the step of combining the foreground, background, and additional scene elements is performed at the same time as the step of filming a foreground.

10. The method for realistic filming as recited in claim 9, further comprising the step of displaying the combined foreground, background, and additional scene elements in real-time on studio monitors during the step of filming the foreground.

11. The method for realistic filming as recited in claim 10, further comprising the step of broadcasting the combined foreground, background, and additional scene elements live during the step of filming the foreground.

12. The method for realistic filming as recited in claim 8, wherein the step of filming a background is performed prior to the step of filming a foreground.

13. The method for realistic filming as recited in claim 8, wherein the step of rendering additional scene elements is performed by a video game engine.

14. The method for realistic filming as recited in claim 8, wherein the steps of rendering additional scene elements and combining the foreground, background, and additional scene elements are performed by a video game engine.

15. The method for realistic filming as recited in claim 8, wherein the step of rendering additional scene elements is performed by a video game engine, and wherein the step of combining the foreground, background, and additional scene elements is performed by a virtual studio system.

* * * * *